May 17, 1966  N. S. REYNOLDS  3,251,224
SPRING TESTER
Filed Oct. 2, 1963
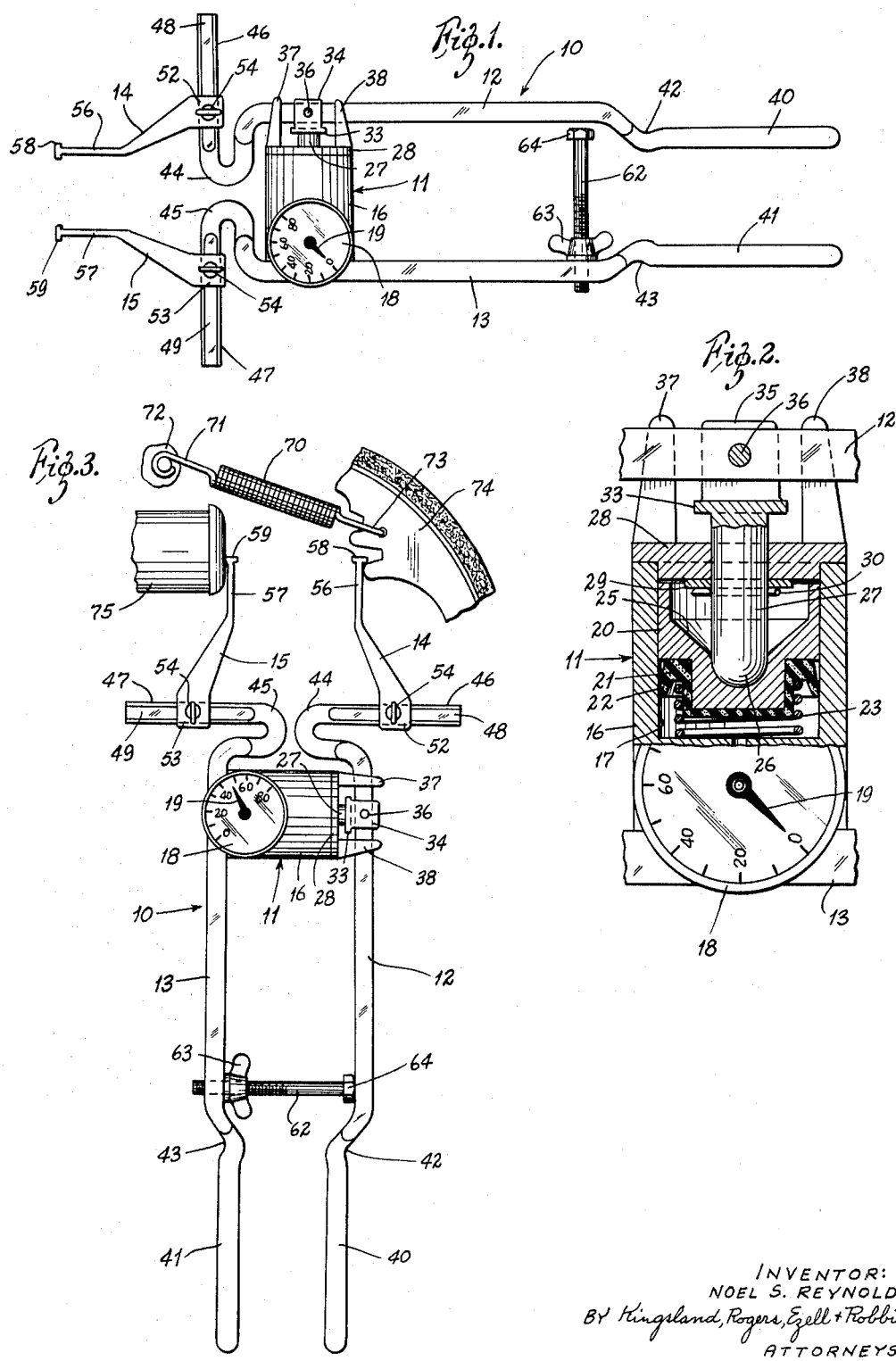
INVENTOR:
NOEL S. REYNOLDS,
BY Kingsland, Rogers, Ezell + Robbins
ATTORNEYS United States Patent Office 3,251,224
Patented May 17, 1966

3,251,224
SPRING TESTER
Noel S. Reynolds, Webster Groves, Mo., assignor to Otto-Items, Inc., St. Louis, Mo., a corporation of Missouri
Filed Oct. 2, 1963, Ser. No. 313,320
2 Claims. (Cl. 73—161)

This invention relates to a spring tester that is manually operable to provide a quick test of the force of a tension spring. In general, the spring tester comprises a pair of lugs that are connected to the ends of a pair of operating handles. The handles are pivoted about a resistance device that exerts a resistive force proportional to the force exerted in squeezing the handles together. When the lugs are placed between two relatively movable members that can be spread apart only against a spring resistance and the handles are squeezed, the resistance element produces a measurement of the spring resistance.

The general object of the invention is to provide a compact manually operable spring tester for indicating the strength of a spring that is otherwise difficult to measure.

In the drawing:

FIGURE 1 is a side elevation view of the spring tester in its non-operating condition;

FIGURE 2 is an enlarged view in section of the force indicating device; and

FIGURE 3 is a side elevation view of the spring tester of FIGURE 1 shown in operating condition testing the strength of a spring on an automobile brake shoe.

The spring tester 10 comprises a force indicating device 11 to which a pair of operating handles 12 and 13 is attached, with a pair of operating jaws 14 and 15 connected to the handles. The force indicating device 11 comprises a body 16 having a hydraulic fluid reservoir 17 within it, and a meter 18 having a needle 19 that moves past graduations in response to pressure exerted upon the hydraulic fluid within the hydraulic reservoir 17. Such meters are available on the open market. In this spring tester, the hydraulic fluid reservoir 17 is provided with a movable wall that is provided by a sliding piston 20. A rubber or suitable plastic cup 21 is mounted on the head of the piston 20 and has a flexible outer skirt 22 that slides along the side wall of the reservoir 17 to provide a fluid seal. A compression spring 23 bears against the cup 21 from the opposing reservoir wall to bias the piston 20 in a return stroke direction.

The back 25 of the piston 20 is dished to receive the head 26 of a plunger 27. The plunger 27 is slidable through a cap 28 fixed to the body 16 of the device 11. There is a washer 29 held in place on the plunger by a cotter pin 30 to contact the cap 28 and limit the return stroke of the plunger.

The plunger 27 has an enlarged shoulder 33 outside the body 16 and has a pair of ears 34 and 35 projecting upwardly therefrom. The handle 12 is pivotally mounted between the ears 34 and 35 by a pin 36. Two pairs of guides 37 and 38 project upwardly from the cap 28 on opposite sides of the plunger 27 to guide the pivotal movement of the handle 12 in a single plane.

Two ends 40 and 41 of the handles 12 and 13 are bent to provide hand grips. There are curves 42 and 43 at the forward ends of these hand grips to provide points of pressure concentration. The other ends of the handles 12 and 13 are bent to form inwardly directed loops 44 and 45 so that two straight lateral sections 46 and 47 can be provided with a maximum inward extension. These lateral sections 46 and 47 have flattened opposing sides 48 and 49.

The jaws 14 and 15 have ears 52 and 53 that are in pairs on opposite sides of the lateral extensions 48 and 49. A thumbscrew 54 is threaded through one ear of each pair 52 and 53. The jaws 14 and 15 are bent as illustrated in the drawings so that their operating ends 56 and 57 are closer together than the thumbscrews 54. The tips 58 and 59 of the operating ends extend laterally beyond the operating ends 56 and 57 as shown.

A bolt 62 is threaded through one of the handles 13. There is a wing nut 63 to lock the bolt 62 in place, and the bolt has a head 64 on it opposite the inner side of the handle 12. The bolt 62 provides an adjustable stop that determines the distance the handles 12 and 13 can be squeezed together.

FIGURE 3 shows how the spring tester 10 can be used to test the force of a tension spring 70 that has one end 71 attached to the relatively fixed anchor on a backing plate 72 and the other end 73 attached to a brake shoe 74 that is movable relative to the anchor 72. Part of a hydraulic wheel cylinder 75 is shown spaced from the brake shoe 74. The cylinder 75 is fixed to the backing plate. The return springs 70 between the brake shoe and anchor pin are examples of springs that must perform an important function and that are subject to deterioration. Heretofore there has been no convenient way to sucessfully test the strength of such springs. This spring tester will test the strength of springs like these.

Generally speaking, the spring tester 10 is preadjusted, prior to testing a spring, for a predetermined distance of travel of the handles 12 and 13 when they are squeezed to produce a predetermined reading on the indicator 18. These prior adjustments include setting the bolt 62 at the proper position by turning it through the handle 13 and then locking it in place by the wing nut 63, and by setting the jaws 14 and 15 in the proper positions on the lateral handle extensions 46 and 47 and tightening them in place by threading down the thumbscrews 54. For example, the spring tester as illustrated in FIGURE 1 has the handles 12 and 13 spread apart in preparation for use. Before being used, the jaws 14 and 15 are positioned on the lateral handle extensions 46 and 47 at such positions that they will just contact objects like the cylinder 75 and the brake shoe 74 that they are to bear against. The bolt is set for the amount of travel desired for the handles 12 and 13.

Thereafter, the jaws 14 and 15 are placed against the brake shoe 74 and the wheel cylinder 75, and the handle grips 40 and 41 are squeezed to pivot the handle about the pin 36 until it stops against the head 64 of the bolt 62. When the handles are squeezed, the pressure is concentrated at the points 42 and 43.

The hydraulic fluid within the fluid reservoir 17 resists movement of the piston 20, so when the handles are squeezed, the pivoting of the handle 12 about the pin 36 causes the brake shoe 74 to move relative to the cylinder 75 against the restraining force of the tension spring 70. If the spring 70 has the proper spring force, it resists movement of the brake shoe 74 sufficiently to overcome the resistance of the hydraulic fluid or part of that resistance as the piston 20 is pressed against the hydraulic fluid. When the piston moves, it causes a reading on the meter 18 that corresponds to the force of the spring 70.

Various changes and modifications may be made within the purview of this invention as will be readily apparent to those skilled in the art. Such changes and modifications are within the scope and teaching of this invention as defined by the claims appended hereto.

What is claimed is:

1. A spring tester comprising a pair of handles, a variable resistance device having a body and an element movable relative to the body and having means for indicating the force required to move the movable element, one handle being connected to the body and the other handle being connected to the movable element, at least one such handle connection being a pivotal attachment, the handles having first ends on one side of the resistance device and second ends on the opposite side of the resistance device, the first ends having mutually oppositely extending arms, a pair of jaws, means to slidably mount the jaws on the arms for relative slidable movement relative to one another to adjust the spacing between the jaws, means to lock the jaws in selected positions on the arms, the jaws being adapted to fit between parts that are separable against a spring force, the second ends being spaced for convenient manual grasping to squeeze them together.

2. The spring tester of claim 1 including an adjustable stop for regulating the relative distance the second ends can move when squeezed together, the resistance device being a hydraulic element.

References Cited by the Examiner

UNITED STATES PATENTS

| | | | |
|---|---|---|---|
| 1,822,587 | 9/1931 | Essen | 73—161 |
| 1,967,618 | 7/1934 | Jaewieck | 33—148 |
| 2,018,219 | 10/1935 | Morgan et al. | 73—161 |
| 2,494,571 | 1/1950 | Milburn | 73—141 |
| 3,054,189 | 9/1962 | Coulson | 33—147 |

LOUIS R. PRINCE, *Primary Examiner.*

M. B. HEPPS, *Assistant Examiner.*